United States Patent
Jeon et al.

(10) Patent No.: US 8,246,178 B2
(45) Date of Patent: Aug. 21, 2012

(54) FOCUS CONTROL DEVICE FOR BEAM PROJECTOR

(75) Inventors: Myeong-Ho Jeon, Incheon (KR);
Moon-Chul Shin, Gyeonggi-do (KR);
Kang-Hoon Choi, Gyeonggi-do (KR);
Hyon-Myong Song, Daegu (KR);
Jin-Hee Cho, Gyeonggi-do (KR);
Kyung-Han Kim, Gyeonggi-do (KR);
Hyun-Jun Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 380 days.

(21) Appl. No.: 12/700,818

(22) Filed: Feb. 5, 2010

(65) Prior Publication Data
US 2010/0265475 A1 Oct. 21, 2010

(30) Foreign Application Priority Data
Apr. 15, 2009 (KR) .................. 10-2009-0032828

(51) Int. Cl.
*G03B 3/00* (2006.01)
*G02B 7/04* (2006.01)
(52) U.S. Cl. ..................... 353/101; 359/823
(58) Field of Classification Search .......... 359/809, 359/811, 813, 814
See application file for complete search history.

(56) References Cited

U.S. PATENT DOCUMENTS

| 2005/0270502 | A1* | 12/2005 | Iinuma ................ 353/101 |
| 2007/0211228 | A1* | 9/2007 | Okada ................ 353/101 |
| 2010/0208219 | A1* | 8/2010 | Lee ................ 353/101 |
| 2011/0292524 | A1* | 12/2011 | Kang et al. ........... 359/811 |

FOREIGN PATENT DOCUMENTS

| KR | 10-0735422 | 6/2007 |
| KR | 10-0810260 | 2/2008 |

* cited by examiner

*Primary Examiner* — William C Dowling
(74) *Attorney, Agent, or Firm* — Cha & Reiter, LLC

(57) ABSTRACT

A focus control device for a beam projector allows the focus of a lens assembly to be finely and easily controlled. The focus control device includes: a control member rotatably mounted on the beam projector for controlling the focus of a lens assembly; a rotary eccentric member provided in the control member, the rotary eccentric member having a control axis eccentric to the rotary axis of the control member, and being rotated while depicting an elliptical trace in response to the rotation of the control member; a focus guide member provided in the rotary eccentric member, the focus guide member allowing the lens assembly to be moved rectilinearly in the direction of an optical axis in response to the rotation of the control member; and an actuating member provided in the lens assembly and coupled to the focus guide member, the actuating member moving the lens assembly in the direction of the optical axis in response to the movement of the focus guide member. According to the present invention, with the rotation of the rotary dial, the moving distance of the lens assembly can be easily controlled, and the lens assembly can be moved finely to project a sharp picture image.

15 Claims, 7 Drawing Sheets

FOCUS CONTROL DEVICE FOR BEAM PROJECTOR

CLAIM OF PRIORITY

This application claims the benefit of the earlier filing date, under 35 U.S.C. §119(a), to that patent application entitled "Focus Control Device For Beam Projector" filed in the Korean Intellectual Property Office on Apr. 15, 2009 and assigned Serial No. 10-2009-0032828, the contents of which are hereby incorporated by reference.

BACKGROUND OF THE INVENTION

1. Field of the Invention

The present invention relates to a beam projector, and more particularly to a focus control device for a beam projector, which allows the focus of the beam projector to be easily controlled.

2. Description of the Related Art

Typically, a portable electronic device is a personally carried compact electronic communication device, such as a portable terminal, a cell phone, an MP3 player, a PMP, or combinations thereof, that can be carried personally so as to come in contact with various contents. In particular, the portable terminal is a portable electronic device that is capable of being carried personally and has at least one of voice and image communication functions, an information input/output function, and/or a data storage function. In addition, according to functional diversity, the portable terminal has composite functions, such as photographing still and/or moving pictures, reproducing music or moving picture files (multimedia), implementing games, receiving broadcasts, or the like, and is fabricated in the form of an integrated multimedia device.

In terms of software and hardware, various novel attempts are applied to such a portable device so as to implement composite functions. For example, a user interface is provided so as to allow a user to easily, and conveniently, search or select a desired function. In particular, since such a portable terminal is fabricated as a multimedia device, which is most diverse in terms of function among the various portable electronic devices, the portable terminal is equipped with electronic components, such as a camera module, a broadcast receiving module, or the like, that are required for implementing various functions beyond that of the wireless communication function of the portable terminal.

Recently, a beam projector function (an image projecting function) has been implemented in such a portable terminal. In general, a "beam projector" implies a device that forms an image on a display device, transmits light produced from a separate light source to the display device so as to project and provide the image on an external large screen.

The construction of such a beam projector is described in detail in Korean Patent No. 10-0810260 entitled, "Portable Terminal with Projector," and Korean Patent No. 10-0735422 entitled, "Image Offset Control Device for Liquid Crystal Projector," which were filed in the name of the applicant of the present application and published on Mar. 23, 2007 and published on May 8, 2009, respectively.

FIG. 1 shows a portable terminal with a conventional beam projector, and FIGS. 2 and 3 show a side view and an internal view, respectively, of the mounting of a beam projector in the body of the portable terminal of FIG. 1.

As shown in FIGS. 1 to 3, a beam projector 10 is mounted on one side of the body housing 1 of a portable terminal, so that a multimedia function related to a moving picture, a DMB, a game or the like, or contents stored in a memory of the portable terminal can be visualized on an external wall or an external screen 20. The beam projector 10 is provided with a window 2 for projecting an image to the one side of the body housing 1. A lens assembly 11 is provided inside of the area where the window 10 is mounted. In addition, the beam projector 10 is provided with a focus control device 3 for controlling the quality of the image projected through the lens assembly 11. The focus control device 3 has a focus control member 12 exposed to the outside. The focus control member 12 has an actuating member 13 as a control handle which can be manually manipulated by a user. The focus control member 12 is mounted in a manner to be capable of being moved rectilinearly in the direction of the optical axis of the lens assembly 11.

However, since the control handle provided to be exposed to the outside of the body housing is very small, and the inner and outer spaces for controlling the control handle are very narrow, there is a problem in that it is inconvenient for the user to slide the control handle.

In addition, since the size of a guide groove (not shown), which is provided for allowing the control handle to be moved, has a limited size, the control handle must be slid within a restricted space. In addition, the control handle is caused to stop at the opposite ends of the guide groove while it is being slid. Consequently, there is a problem in that the control handle is very poor in terms of mobility.

SUMMARY OF THE INVENTION

The present invention provides a focus control device for a beam projector that allows the focus of the beam projector to be easily controlled.

In addition, the present invention provides a focus control device for a beam projector, which enables fine focus control through the rotation of the focus control device, thereby improving a user's convenience, and making a high definition image clear.

According to an aspect of the present invention, there is provided a focus control device for a beam projector including: a control member rotatably mounted on the beam projector for controlling the focus of a lens assembly; a rotary eccentric member provided in the control member, the rotary eccentric member having a control axis eccentric to the rotary axis of the control member, and being rotated while depicting an elliptical trace in response to the rotation of the control member; a focus guide member provided in the rotary eccentric member, the focus guide member allowing the lens assembly to be moved rectilinearly in the direction of an optical axis in response to the rotation of the control member; and an actuating member provided in the lens assembly and coupled to the focus guide member, the actuating member moving the lens assembly in the direction of the optical axis in response to the movement of the focus guide member.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
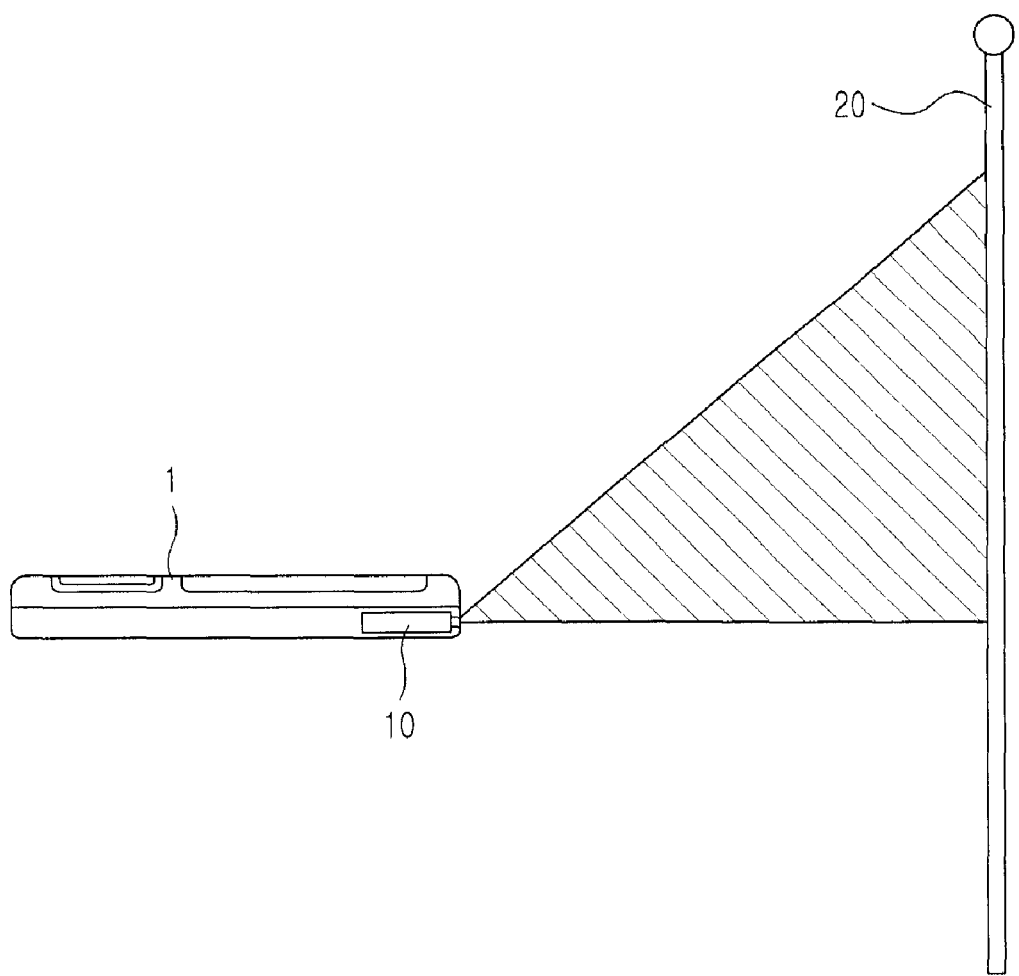
FIG. 1 is a schematic view showing a conventional beam projector provided in a portable terminal.
Figure 2:
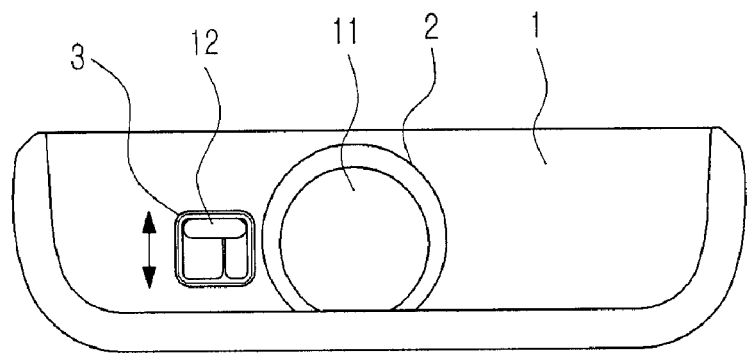
FIG. 2 is a side view of a focus control device for the conventional beam projector.
Figure 3:
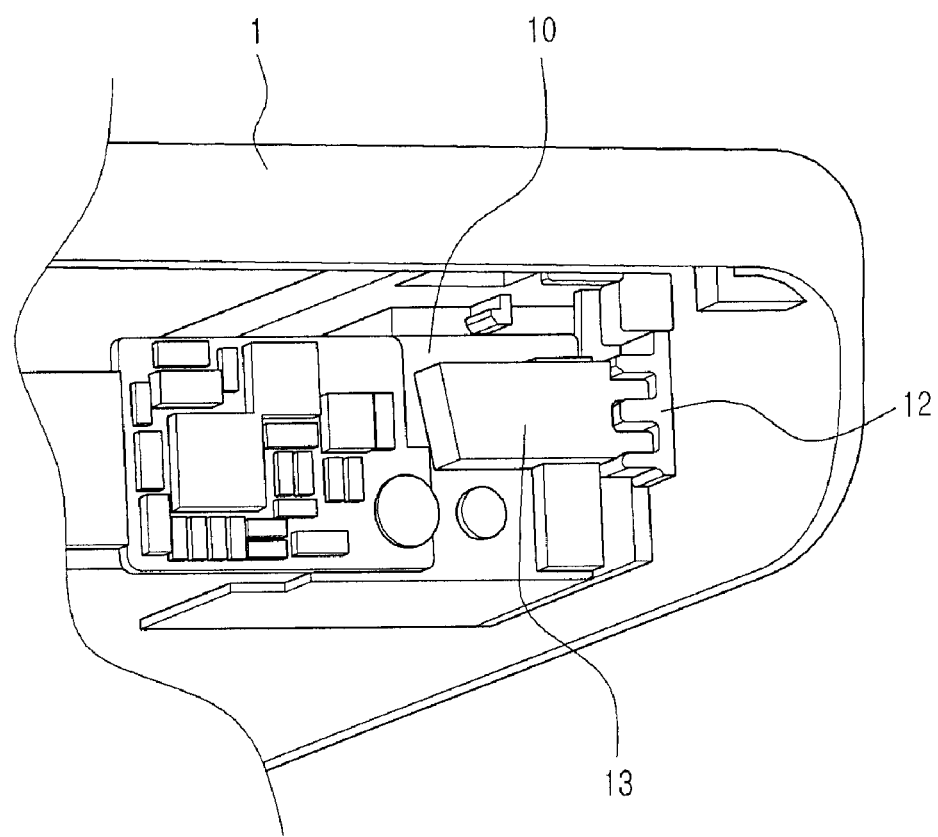
FIG. 3 is an internal view showing the conventional beam projector provided in a portable terminal in the state in which it is being used.

Exemplary embodiments of the present invention will be described with reference to the accompanying drawings. In the following description, the same members will be designated by the same reference numerals although they are shown in different drawings. Further, in the following description of the present invention, a detailed description of known functions and configurations incorporated herein will be omitted when it may make the subject matter of the present invention rather unclear.

Referring to FIGS. 4 to 10, the focus control device 100 for a beam projector includes a control member 110, a rotary eccentric member 113 (see FIG. 8), a focus guide member 120, and an actuating member 130. The control member 110 is rotatably mounted in the beam projector 10 so as to control the focus of a lens assembly 11. The rotary eccentric member 113 has a central axis A3 eccentric to the rotary axis A1 of the control member 110 (see FIG. 7), and is provided in the control member 110 so that the rotary eccentric member 113 is rotated while depicting an elliptical trace in response to the rotation of the control member 110. The focus guide member 120 is provided on the rotary eccentric member 113 so that the focus guide member 120 can guide the lens assembly 11 to be moved rectilinearly in the direction of the optical axis A2 thereof. The actuating member 130 is provided in the lens assembly 11, and engaged with the focus guide member 120 so as to move the lens assembly 11 in the direction of the optical axis A2.

The control member 110 consists of a rotary dial 111 and a support frame 112. The rotary dial 111 is rotatably mounted so as to control the focus of the lens assembly 11. The support frame 112 is assembled to the beam projector 10 in such a manner that the rotary dial 111 is rotatably seated in the support frame 112.

As shown in FIGS. 4, 6, 7 and 8, an axial protrusion 111a is provided at the center of the rotary dial 111, wherein the axial protrusion 111a is rotatably attached to the support frame 112, thereby forming the rotary axis A1 of the rotary dial 111.

As shown in FIGS. 7 to 10, the rotary eccentric member 113 is formed in a circular shape projecting from one side of the rotary dial 111 in such a manner that the rotary eccentric member 113 has a central axis A3 eccentric to the center of the axial protrusion 111a. The central axis A3 is driven while depicting an elliptical trace in response to the rotation of the rotary dial 111. (see FIGS. 9 and 10).

Figure 4:
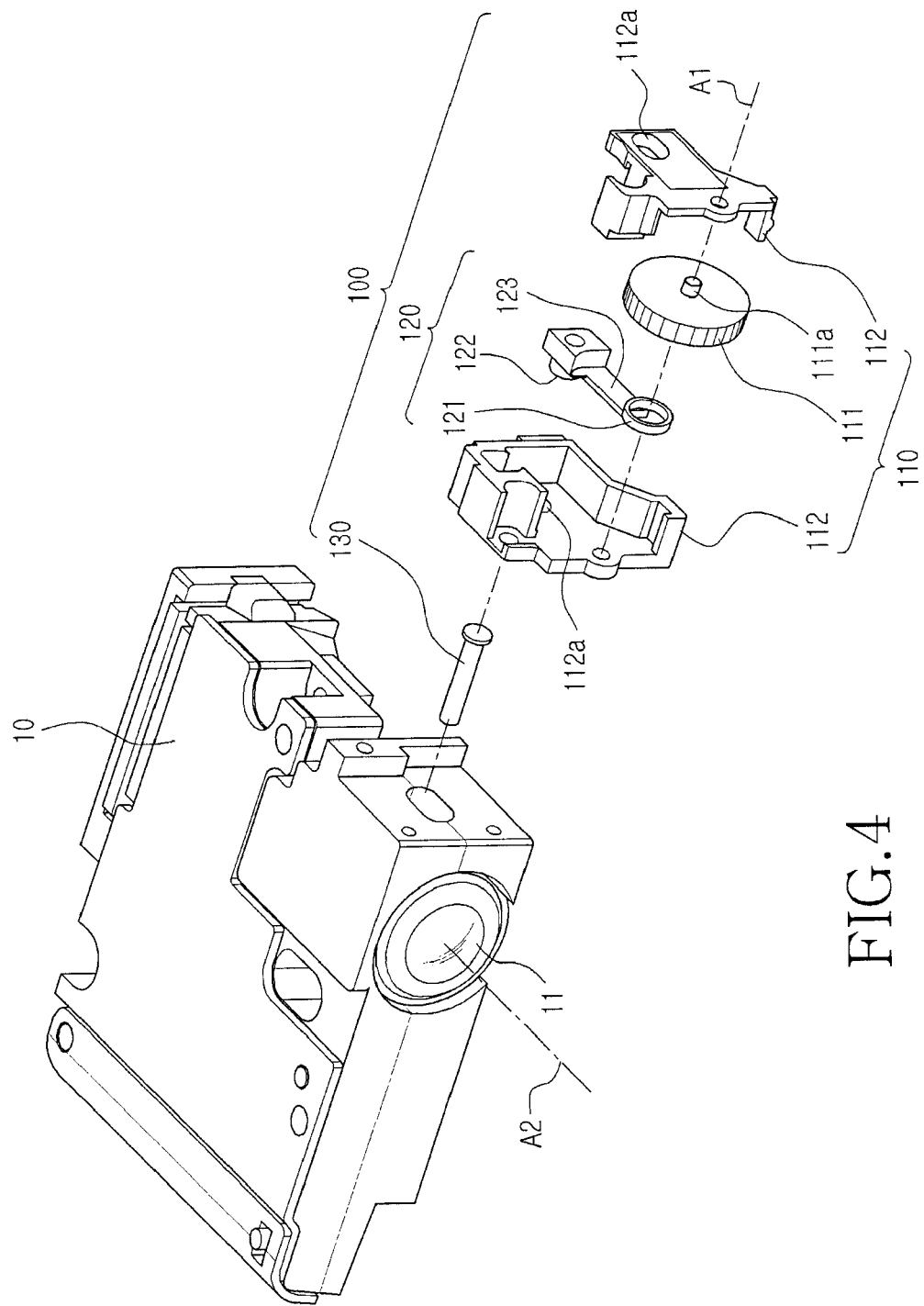
FIG. 4 is an exploded perspective view of a focus control device for a beam projector in accordance with an embodiment of the present invention.
Figure 5:
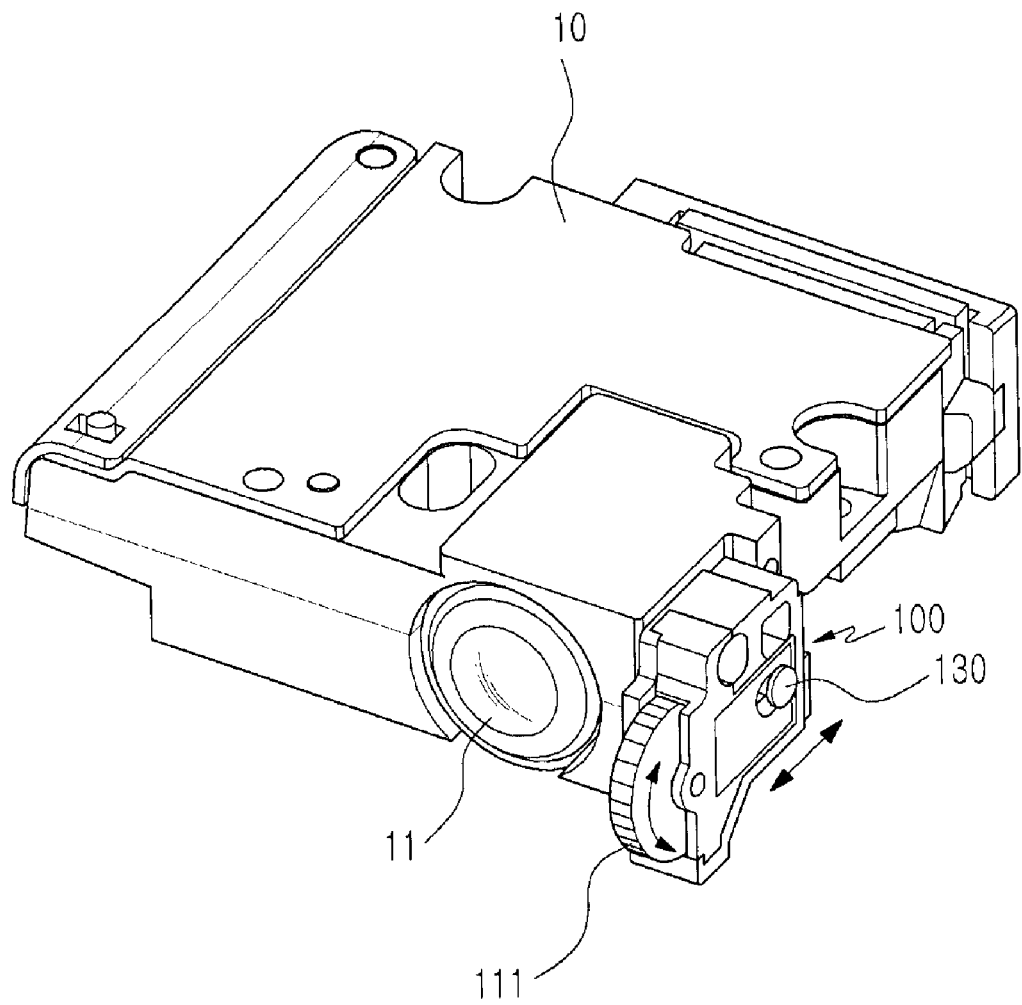
FIG. 5 is a view showing the beam projector of FIG. 4 in an assembled state.
Figure 7:
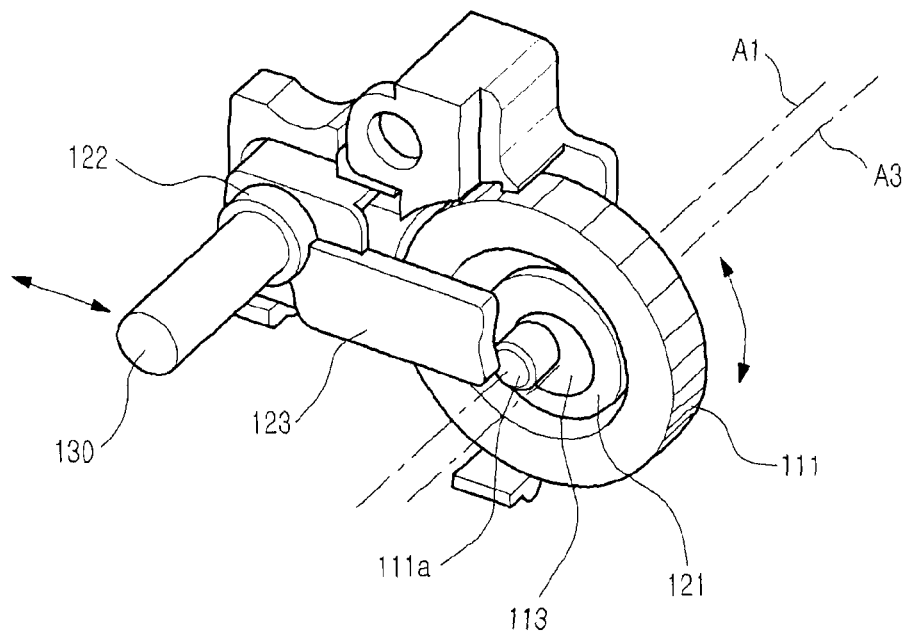
FIG. 7 is a perspective view showing the focus control device of the beam projector of FIGS. 4 to 6 in the assembled state.

As shown in FIGS. 4, 5 and 7, the support frame 112 is formed with a guide hole 112a, wherein the actuating member 130 extends through the guide hole 112a so that the actuating member 130 can be moved rectilinearly through the guide hole 112a.

The focus guide member 120 interconnects the rotary dial 111 and the actuating member 130, and is engaged with the rotary eccentric member 113 so as to convert the rotation of the rotary dial 111 into the rectilinear movement of the actuating member 130 in the direction of the optical axis A2. The focus guide member 120 consists of a connecting plate 123, a first connecting hole 121, and a second connecting hole 122. The connecting plate 123 is interposed between the rotary dial 111 and the actuating member 130 so as to interconnect the rotary dial 111 and the actuating member 130. The first connecting hole 121 is positioned at an end of the connecting plate 123 so that the first connecting hole 121 is engaged with the rotary eccentric member 113 and is rotated in response to the rotation of the rotary eccentric member 113. The second connecting hole 122 is formed at the other end of the connecting plate 123 so that the actuating member 130 can be mounted through the second connecting hole 122.

As shown in FIGS. 4 to 7, the actuating member 130 is formed in a pin shape, and seated in the guide hole 112a. In addition, the actuating member 130 extends through the second hole 122, thereby being engaged with the lens assembly 111.

Figure 9:
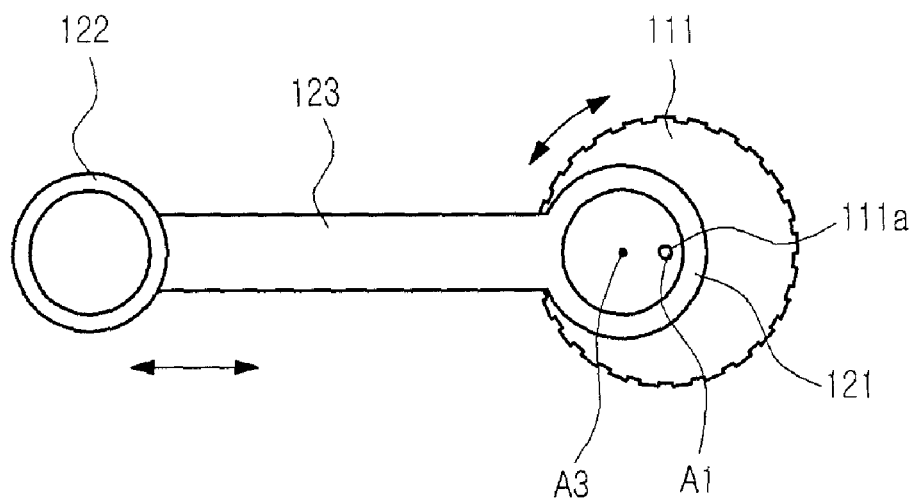
FIG. 9 is a view showing a focus guide member assembled with a rotary eccentric member in the focus control device of the beam projector of FIG. 7.
Figure 10:
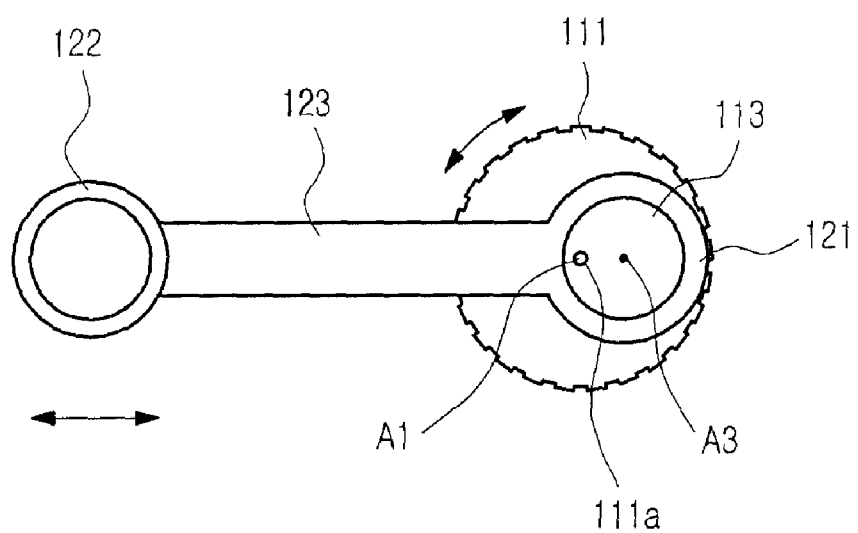
FIG. 10 is a view showing how the focus guide member is moved rectilinearly in response to the rotation of the rotary eccentric member.

As shown in FIGS. 9 and 10, the rotary eccentric member 113 is rotated on a side of the rotary dial 111 in response to the rotation of the rotary dial 111 while depicting an elliptical trace. The first connecting hole 121 is engaged with the rotary eccentric member 113, so that the first connecting hole 121 is rotated along an elliptical trace in response to the rotary dial 111. The connecting plate 123 allows the second connecting hole 122 to be moved rectilinearly in the direction of the optical axis A2 as the first connecting hole 121 moves along the elliptical trace. The second connecting hole 122 is moved rectilinearly in the direction of the optical axis A2 by the connecting plate 123, thereby moving the actuating member 130 in the direction of the optical axis A2. The actuating member 130 moves the lens assembly 111 in the direction of the optical axis A2, thereby adjusting the focus of the lens 111 within beam projector 10.

The operation of the inventive focus control device for a beam projector having the above-mentioned construction will be described in more detail with reference to FIGS. 4 to 10.

As shown in FIGS. 4 to 10, the inventive focus control device 100 is mounted on one side of the beam projector 10. The focus control device 100 converts a rotational force produced by rotation of a driving wheel into driving force causing rectilinear movement in the direction of the optical axis A2, wherein the lens assembly 11 of the beam projector 10 is moved rectilinearly in the direction of the optical axis A2 in response to the rotation of the control member 110, so that the focus of the lens assembly 11 can be adjusted.

Figure 6:
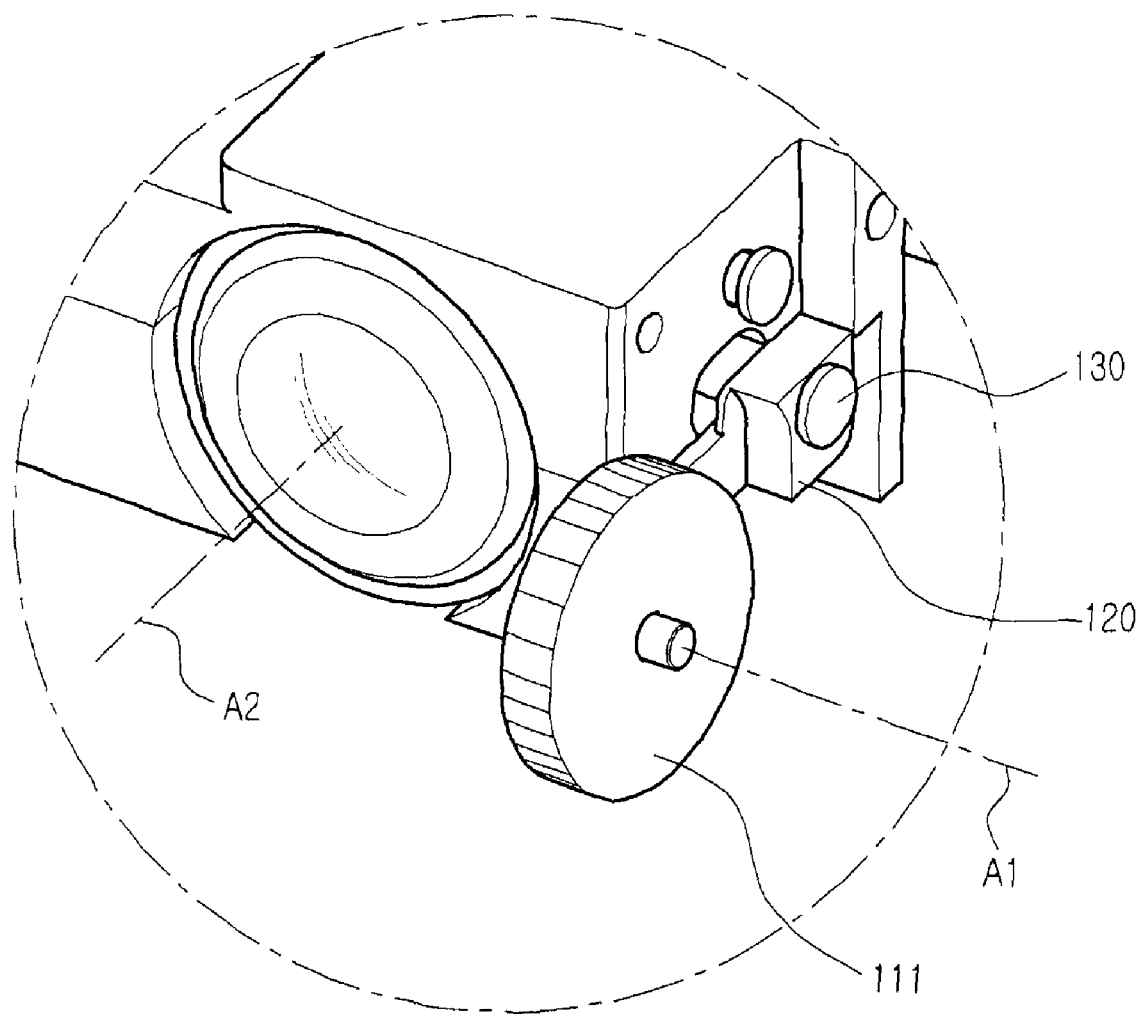
FIG. 6 is an enlarged perspective view of a part of the beam projector of FIGS. 4 and 5.

As shown in FIGS. 4, 6 and 7, the actuating member 130 is assembled to the lens assembly 11 through the support frame 112 and the focus guide member 120 in the state in which one end of the actuating member 130 is engaged with the outer side of the support frame 112, so that the actuating member 130 moves the lens assembly 11 in the direction of the optical axis A2 in response to the rotation of rotary dial 111.

As shown in FIGS. 4 and 5, a part of the control member 110 is preferably exposed to the outside of a portable electronic device for mounting the beam projector 10 so as to allow the focus of the lens 11 to be adjusted. The support frame 112 is preferably formed by two parts, wherein the two oppositely positioned parts coupled to the rotary dial 111 making the rotary dial 111 rotatable between the opposing positioned parts. The support frame 112 is fixed to the beam projector 10. The support frame 112 is arranged along the rotary axis A1, thereby rotatably supporting the rotary dial 111. In this state, the support frame 112 is mounted on a side of the beam projector 10. The support frame 12 is formed with the guide hole 112a, so that the actuating member 130 extends through the guide hole 112a. The actuating member 130 can be moved rectilinearly in the longitudinal direction in the direction of the optical axis A2.

Figure 8:
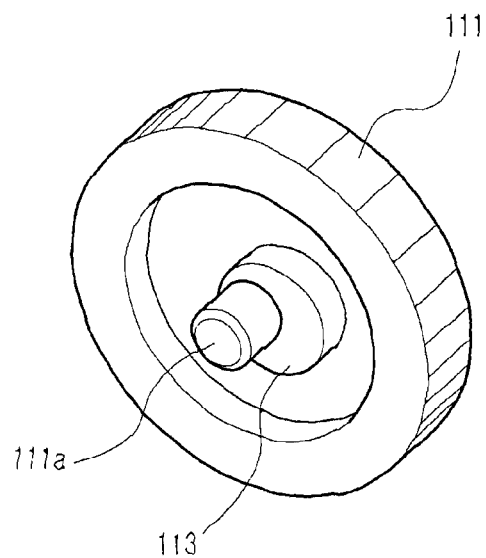
FIG. 8 is an enlarged perspective view showing a rotary dial in the focus control device of the beam projector of FIG. 7.

As shown in FIGS. 6 to 8, the rotary dial 111 is circular in shape, and rotatable within the supported frame 112. It is also desirable that protrusions and indentations (not shown) are alternately formed around the periphery of the rotary dial 111. The indentations are also desired in that they allow user to easily rotate the rotary dial 111, as well as to determine the rotated amount of the rotary dial 111 using the touch feeling provided by the indentations. In addition, it is also possible to separately provide a grip device (not shown) in such a manner that the grip device is engaged with the indentations, thereby providing a gripping feeling to the user when the rotary dial 111 is rotated. At the center of the rotary dial 111, the axial protrusion 111a extends from the opposite sides of the rotary dial 111 coaxial to the rotary axis A1, so that the protrusion 111a can be rotatably fixed to the support frame 112. In addition, the axial protrusion 111a, which is in contact with the focus guide member 120, is formed with the rotary eccentric member 113 in the circular shape projecting radially from the focus guide member 120, wherein the central axis A3 of the rotary eccentric member 113 is eccentrically offset from the rotary axis A1 by a predetermined distance.

As shown in FIGS. 7 to 10, the rotary eccentric member 113 is provided on a side of the rotary dial 111 in the circular shape, so that the rotary eccentric member 113 is engaged with the first connecting hole 121 so as to rotate the focus guide member 120. Preferably, the rotary eccentric member 113 has a form to be conformally engaged with the inner wall of the first connecting hole 121. The center of the rotary eccentric member 113 has the central axis A3 which is offset from the rotary axis A1. Therefore, the central axis A3 rotates in an elliptical trace when the rotary dial 111 rotates.

As shown in FIGS. 4, 6 and 7, the focus guide member 120 is provided between the rotary dial 111 and the support frame 112 so as to interconnect the rotary dial 111 and the actuating member 130. The focus guide member 120 includes the first connecting hole 121 which is engaged with the rotary eccentric member 113, the second connecting hole 122, through which the actuating member 130 extends, and the connecting plate interconnecting the first connecting hole 121 and the second connecting hole 122. Because the first connecting hole 121 is coupled to the rotary eccentric member 113, the first connecting hole 121 is moved in an elliptical trace, the major axis of which extends in the direction of the optical axis A2. The connecting plate 123 converts the elliptical movement of the first connecting hole 121 into the substantially rectilinear movement in the direction of the optical axis A2, and transmits the rectilinear movement to the second connecting hole 122. Since the rectilinear driving force in the direction of the optical axis A2 is provided to the second connecting hole 122, the driving force is provided to the actuating member 130, which extends through and is engaged with the inner wall of the second connecting hole 122, thereby moving the actuating member 130 in the direction of the optical axis A2.

Therefore, the rotation of the rotary dial 111 is converted into rectilinear motion in the direction of the optical axis A2 by the rotary eccentric member 113 and the focus guide member 120, thereby moving the actuating member 130 rectilinearly in the direction of the optical axis A2. The lens assembly 11 is moved rectilinearly in the direction of the optical axis A2 in response to the movement of the actuating member 130.

Therefore, if the user rotates the rotary dial 111 clockwise or counterclockwise so as to adjust the focus of the beam projector 10, the rotary eccentric member 113 is rotated while depicting an elliptical trace because its central axis A3 is offset from the rotary axis A1. The first connecting hole 121 is engaged with the rotary eccentric member 113, so that the first connecting hole 121 rotates while depicting a trace equal to the elliptical trace of the rotary eccentric member 113. The connecting plate 123 transmits the driving force of the first connecting hole 121 to the second connecting hole 122. The second connecting hole 122 receives the driving force converted to allow rectilinear movement in the direction of the optical axis A2, and transmits the driving force to the actuating member 130. Since the actuating member 130 extends through and is engaged with the second connecting hole 122, the actuating member 130 is moved rectilinearly in the guide hole 112a in the direction of the optical axis A2. In response to the movement of the actuating member 130, the lens assembly 11 is moved rectilinearly in the direction of the optical axis A2, thereby adjusting the focus thereof. As would be recognized guide hole 112a may be elongated to allow the actuating member 130 to move rectilinearly within guide hole 112a (see FIG. 5). Guide hole 112a may be sized such that actuating member 130 may move rectilinearly with the rotation of rotary dial 111 in a single direction. In another aspect, the size of guide hole 112a may control the length of travel of the actuating member, wherein travel of the actuating member 130 is limited by its engagement with one end of the guide hole 112a or the other end of guide hole 112a. In another aspect of the invention, the guide hole 112a may be sized such that the actuating member 130 may travel in a first direction with the rotation of the rotary dial 111 and in a second direction with continuation rotation of the rotary dial 111 in the same direction.

According to the inventive beam projector focus control device, the lens assembly can be moved rectilinearly in the direction of the optical axis by rotating the control member provided in the beam projector, whereby the control of focus of the beam projector can be easily executed.

In addition, with the rotation of the rotary dial, the rectilinear moving distance of the lens assembly can be controlled, and depending on the rotating amount of the rotary dial, fine rectilinear movement of the lens assembly can be executed. Consequently, the focus of the lens assembly can be controlled finely, whereby the projection of a picture image onto an external screen can be brought into sharp focus.

It will be obvious to those skilled in the art that the inventive beam projector focus control device described above is not limited by the above embodiments and accompanying drawings, and various substitution, modification and variation can be made without departing from the technical spirit of the present invention.

For example, although the inventive beam projector is depicted in the drawings in the state in which it is mounted on a portable terminal, it can be mounted on any device, such as an MP3 player, a PMP, a PDA or the like, that allows a user to get various contents while carrying it.

In addition, although the rotary dial and the focus guide member are separately depicted in the drawings, they may be provided in an integrated form.

Furthermore, in the above-mentioned embodiments, it was described that the first connecting hole is integrally formed with the connecting plate so that the first connecting hole is driven along the elliptical trace of the rotary eccentric member in the above embodiments. However, it is also possible to connect the first connecting hole to the connecting plate in such a manner that the first connecting hole is spaced from the connecting plate, so that when the central axis A3 is deflected upward or downward as the rotary eccentric member rotates, the focus guide member is prevented from being driven. If so, the rectilinear movement can be more efficiently executed.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A focus control device for a beam projector, comprising:
    a control member rotatably mounted on the beam projector for controlling the focus of a lens assembly;
    a rotary eccentric member provided in the control member, the rotary eccentric member having a control axis eccentric to the rotary axis of the control member, and being rotated while depicting an elliptical trace in response to the rotation of the control member;
    a focus guide member provided in the rotary eccentric member, the focus guide member allowing the lens assembly to be moved rectilinearly in the direction of an optical axis in response to the rotation of the control member; and
    an actuating member provided in the lens assembly and coupled to the focus guide member, the actuating member moving the lens assembly in the direction of the optical axis in response to the movement of the focus guide member.

2. The focus control device as claimed in claim 1, wherein the control member comprises:
    a rotary dial rotating so as to control the focus of the lens assembly; and
    a support frame coupled to the beam projector, the rotary dial being rotatably seated in the inside of the support frame.

3. The focus control device as claimed in claim 2, wherein the rotary dial is provided with an axial protrusion at the center thereof, the axial protrusion being rotatably fixed to the support frame, thereby forming the rotary axis of the rotary dial.

4. The focus control device as claimed in claim 3, wherein the rotary eccentric member is formed in a circular shape protruding from a side of the rotary dial, and has a central axis offset from the center of the axial protrusion, the central axis being driven while depicting an elliptical trace in response to the rotation of the rotary dial.

5. The focus control device as claimed in claim 2, wherein the support frame is formed with a guide hole, through which the actuating member extends, the guide hole allowing the rectilinear movement of the actuating member.

6. The focus control device as claimed in claim 2, wherein the focus guide member interconnects the rotary dial and the actuating member, the focus guide member being engaged with the rotary eccentric member in such a manner that the focus member moves the actuating member rectilinearly in the direction of the optical axis in response to the rotation of the rotary dial.

7. The focus control device as claimed in claim 5, wherein the focus guide member comprises:
    a connecting plate provided between the rotary dial member and the actuating member, thereby interconnecting the rotary dial and the actuating member;
    a first connecting hole provided at one end of the connecting plate, the first connecting hole being engaged with the rotary eccentric member so that the first connecting hole is rotated in response to the rotation of the rotary eccentric member; and
    a second connecting hole provided at the other end of the connecting plate, the actuating member being mounted through the second connecting hole.

8. The focus control device as claimed in claim 7, wherein the actuating member is formed by a pin, which is seated in the guide hole and coupled to the lens assembly through the second connecting hole.

9. The focus control device as claimed in claim 8, wherein the rotary eccentric member is rotated while depicting an elliptical trace on the one side of the rotary dial in response to the rotation of the rotary dial,
    the first connecting hole is engaged with the rotary eccentric member and rotates along the elliptical trace in response to the rotation of the rotary eccentric member,
    the connecting plate allows the second connecting hole to be moved rectilinearly in the direction of the optical axis in response to the movement of the first connecting hole along the elliptical trace,
    the second connecting hole is moved rectilinearly in the direction of the optical axis by the connecting plate, thereby moving the actuating member in the direction of the optical axis, and
    the actuating member moves the lens assembly in the direction of the optical axis, thereby controlling the focus of the beam projector.

10. A lens control apparatus for controlling a rectilinear movement of a lens, comprising:
    a housing including:
        an actuating member extending from the housing in contact with a lens driving mechanism at one end;
        a rotary dial, within the housing, rotatable along a first axis, the rotary dial including: a rotary member positioned on one side of the rotary dial, the center of the rotary member being offset from the first axis so as to trace an ellipse in response to a rotation of the rotary dial, and a connecting member coupled to the rotary member on a first end and to a second end of the actuating member at a second end, wherein rotation of the rotary dial causes an elliptical movement of the second end of the connecting member which causes a rectilinear movement of the actuating member.

11. The apparatus of claim 10, wherein the housing further comprises an elongated hole through which the actuating member extends.

12. The apparatus of claim 11, wherein the elongated hole defines a length of travel of the actuating member.

13. The apparatus of claim 10, wherein a major axis of the elliptical movement of the connecting member is in the direction of the rectilinear movement of the lens.

14. The apparatus of claim 11, wherein the major axis of the elliptical movement of the connecting member defines a portion of a length of travel of the actuating member.

15. The apparatus of claim 11, wherein the major axis of the elliptical movement of the connecting member defines a length of travel of the actuating member.

* * * * *